United States Patent Office 2,796,197
Patented June 18, 1957

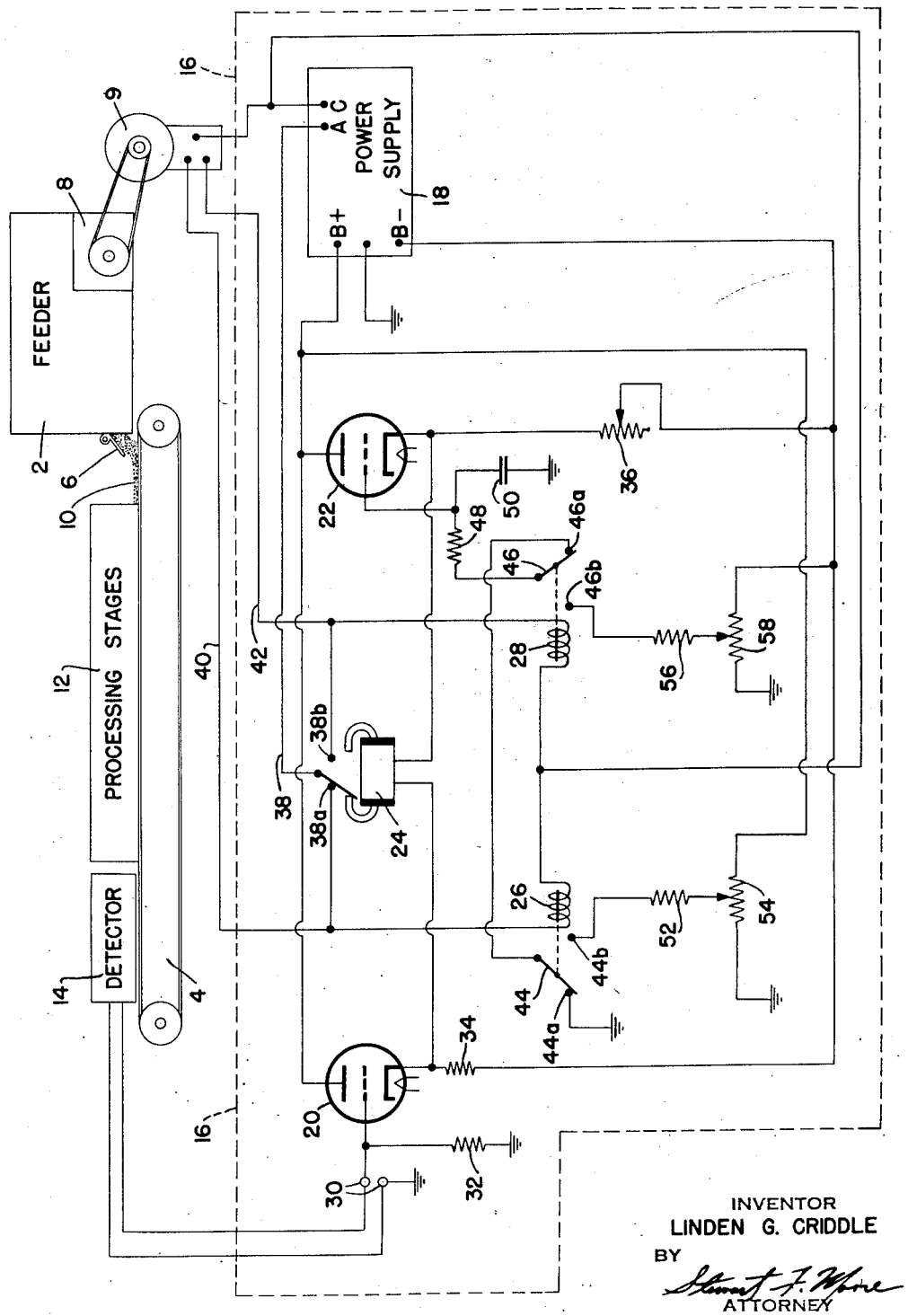

2,796,197

ANTI-HUNTING SYSTEM FOR ELECTRICAL REGULATORS

Linden G. Criddle, Pasadena, Calif., assignor to American Machine & Foundry Co., a corporation of New Jersey Application March 8, 1955, Serial No. 492,929

2 Claims. (Cl. 222—55)

This invention relates to means for reducing hunting in regulating systems. More particularly, it relates to means for reducing hunting in closed loop regulating systems in which a relatively long time interval elapses between certain steps in the regulating cycle, which steps include correction of regulator errors and detection of said corrections by an error detector.

Apparatus for manufacturing products from material being fed in a continuous stream generally incorporates a closed loop, feed-back type of regulating system, wherein detected errors or deviations from a norm in selected characteristics of the material being processed are fed back to a regulating mechanism which accordingly adjusts the apparatus to correct itself in response to such deviations. Such apparatus usually has a feeding station and a station for detecting errors in the quantity of feed, spaced relatively distant from each other, so that a correspondingly large time interval elapses between detection of feeding errors and correction thereof.

Apparatus of this type is particularly employed in cigarette making machines. In these machines, cut tobacco contained in a hopper or feeder is fed in a moving carpet onto a conveyor and carried through several processing steps where it is ultimately rolled into a cigarette rod, and then cut into the desired individual lengths to form a complete cigarette. Near a final station in the process is a detecting device positioned adjacent to the cigarette rod which detects changes in the density thereof. These changes are transmitted as an error signal to an electrical regulator which regulates the quantity of tobacco in the moving carpet in accordance with the magnitude of the error signal. Such regulating system are generally of two types, namely a regulator which responds directly in proportion to the amount of error detected and a regulator which responds not only directly to the magnitude of the error but also in proportion to the amount of time necessary to correct such an error.

Heretofore, both of these systems have been of a type which utilize a potentiometer bridge balancing circuit wherein a potentiometer is mechanically actuated by movement of the regulator itself, and is caused to adjust a voltage which is opposite in polarity to the error signal. The potentiometer is mechanically advanced until the error signal is completely balanced out, whereupon the regulator is de-energized. Such a system has the disadvantage that when the corrected quantity of feed is detected by the characteristic detector, it appears to the balancing circuit as an error in the opposite direction from that previously detected, so that the regulator is again actuated and advanced until the potentiometer is balanced. Thus the regulator is constantly in motion with consequent continuous hunting. The second system mentioned above somewhat reduces hunting in that the voltage against which the adjusting potentiometer is balanced, is made proportional both to the magnitude of the error and the length of time required to correct such error. This latter time is known as the "dead" time, and is usually the length of time elapsing between the instant that the quantity of material fed is increased and the instant when such increased quantity is sensed by an appropriate detector.

As both of these systems utilize a mechanical type of feed back having a constantly adjustable potentiometer, the maintenance of the sliding electrical contacts of such potentiometers under adverse operating conditions is a constant source of trouble. Furthermore, the bridge balancing system is extremely sensitive to small changes in the physical constants of the components thereof, making it difficult to keep in adjustment.

Therefore, it is an object of the present invention to provide an electrical regulating system having a control signal for the regulator proportional to the magnitude of the error and applied only for a selectively fixed period equal to the inherent delay time of the mechanism being adjusted.

Another object of the invention is to provide a regulating system having a closed feed back loop in which there are no mechanically actuated balancing devices for the electrical portion thereof.

Yet another object of the invention is to provide a regulating system in which hunting is reduced to a minimum.

A further object of the invention is to provide a regulating system having means for quickly compensating initially for large errors and means for gradually resetting the regulating system as the error decreases.

It is a still further object of the invention to provide an electrical regulating system having a closed loop feed back control which is low in cost and easy to manufacture.

For a better understanding of the invention, together with other and further objects thereof, reference is made to the following detailed description taken in connection with the accompanying drawing in which is shown a schematic circuit diagram of a preferred embodiment of the invention.

Referring now to the drawing, a feeder generally indicated as 2 feeds material to a conveyor 4. The feeder may be any suitable type and is shown here for purposes of illustration as a hopper adapted to have raw material such as tobacco added thereto, and generally containing a device for thoroughly agitating the material added, and dispensing it in a somewhat uniform quantity on to a conveying system.

Such feeders generally have a gate 6 which has its degree of opening adjusted by a regulating device 8. The regulating device 8 should be of a reversible type which adjusts or is actuated at a constant rate. A suitable drive for the regulator is a synchronous motor 9, coupled to gate 6 by means of a belt drive or suitable gears contained in regulator box 8, which adjusts the degree of opening of gate 6 at a constant rate regardless of the magnitude of the amount of load applied thereto. Motor 9 has conventional forward-reverse windings, not shown. Conveyor 4 carries the material being processed, 10, past a plurality of processing stages generally indicated as 12. These processing stages may be any desired steps in a manufacturing process. In the case of a cigarette machine, such steps may include the forming of the tobacco into a cigarette rod, the sealing of the rod along its longitudinal length, and its final cutting into individual cigarettes.

Positioned near the end of the various processing stages is a detector 14 which is responsive to a selected characteristic of the material being processed. For example, in a cigarette manufacturing machine such a detector is responsive to changes in the density of each individual cigarette. On the other hand, it is obvious that the detector may be responsive to changes in color or other desired characteristics, depending on the choice of detector and type of manufacturing process to which the invention is applied. For example, the amount of dye being applied to cloth being manufactured could be detected by detector 14. In this case, such a detector would be responsive to changes in color and would correct the quantity of dye being applied when necessary.

The regulator feed back system generally indicated as 16 comprises a suitable source of power 18, a pair of electronic valves 20, 22, a polar type relay 24, and a pair of motor starting and reversing relays 26, 28. The valves are illustrated as triodes, but it is understood that other types of electronic valves, such as tetrodes, pentodes, or transistors, may be used. Connected between input terminals 30 and ground, is a grid to ground return resistor 32 for valve 20. The cathode of valve 20 is connected through a cathode dropping resistor 34 to a suitable source of negative voltage furnished by a conventional power supply 18. Similarly, valve 22 has its cathode connected through a dropping resistor 36 to the D. C. negative bias voltage furnished by power supply 18. The anodes of both valves are connected in parallel to a source of positive voltage furnished by power supply 18.

Connected between the cathodes of valves 20 and 22 is a polar relay 24 having an armature 38 and contacts 38a and 38b. One side of the A. C. power lines which may supply either 110 or 220 volts A. C. is connected to regulator 8 and to one terminal of relays 26, 28. The other side of the A. C. power line is connected to polar relay armature 38. Connected to relay contact 38a is a line 40, connected to one rotation selection coil of motor 9, for supplying current thereto. Connected to contact 38b is a line 42 which is connected to the other rotation selection coil of motor 9, but causes it to rotate in a direction opposite to the direction resulting from energization of line 40.

Thus, the direction of rotation of regulator 8, and consequently whether it increases or decreases the degree of material fed from said feeder 2, will depend on whether line 40 or 42 is connected to the A. C. power lines. Choice of such a connection in turn depends on the direction of current flow through polar relay 24.

Also connected to contacts 38a and 38b are the other terminals of relays 26 and 28, respectively, so that actuation of armature 38 applies A. C. power to either relay 26 or 28, depending on the direction in which armature 38 moves. Connected to armature 46 of relay 28 through contact 46b is series resistor 48 and the control electrode of valve 22. A capacitor 50 is connected between the control electrode of valve 22 and ground.

Relays 26, 28 have single pole-double throw contacts; contact 44a is connected to ground, while contact 46a is connected to armature 44. Contact 44b is connected to the positive or b-plus terminal of power supply 18 through resistor 52 and potentiometer 54. Contact 46b is connected to the negative voltage or b-minus terminal of power supply 18 through a resistor 56 and potentiometer 58.

In operation, a change in a selected characteristic of the material from a desired, predetermined norm, which may be, for example, an adjustable bias setting, is detected by detector 14, and this change or deviation is translated by detector 14 into a representative electrical voltage and fed into the input terminals 30 of valve 20. Assuming for purposes of illustration that the error signal is positive, the plate current from valve 20 will increase, causing an increase in the voltage developed across cathode resistor 34. This causes a current to flow through the magnetic coil of polar relay 24 which actuates armature 38. By connecting the coil of relay 24 so that the appearance of a positive error signal at input terminals 30 causes armature 38 to be attracted to contact 38a, then, as the error signal is positive, indicating a heavy product, regulator 8 is energized through line 40 and rotates in a manner such as to reduce the amount of material being fed to conveyor 4 through gate 6. In the type of feeder shown in the drawing, this would be effected by reducing the opening of gate 6.

When armature 38 engages contact 38a, line voltage is also applied to relay 26, causing armature 44 to engage contact 44b and apply a positive voltage to the control electrode of valve 22. This voltage may be adjusted to a suitable value by means of potentiometer 54. Capacitor 50 will then begin to charge through resistor 52 and series resistor 48. When the charging voltage has reached a value of such magnitude that the plate current flow in valve 22 is sufficient to develop a voltage across resistor 36 equal to the voltage developed across cathode resistor 34, then polar relay 24 will assume its de-energized or central position, thereby disconnecting line 40 from the source of A. C. power and stopping motor 9. As motor 9 is a constant speed motor of the synchronous type, its rate of change of feed gate 6 is also constant. Therefore, if the time constant of capacitor 50 in combination with resistors 48, 52, is adjusted to be long in comparison to the time required for the motor 9 to make normal changes in the amount of feed, the charging rate becomes essentially linear over the desired operating range, and can be adjusted by a suitable selection of values for resistors 48, 52, and adjustment of potentiometer 54, to be representative of the constant speed of the regulator motor 9 or, more precisely, to the rate of change of feed gate 6.

Therefore, the change in amount of feed is proportional to the amount of error detected by detector 14. The response of the feeder to regulator changes is not instantaneous, even though the adjustment of gate 6 may be very fast acting, so that any correction in the amount of feed is gradual and is detected by detector 14 as a correspondingly gradual decrease in error. To prevent hunting, which would result if valve 22 were allowed to respond instantaneously to a decrease in error signal from detector 14, capacitor 50 is allowed to discharge slowly to ground through resistor 48 when relays 26 and 28 are de-energized. Thus, in the case of a positive error signal, by proper selection of values for resistor 48, the discharge rate of condenser 50 can be adjusted to represent substantially the gradual decrease in error voltage occurring in the example as the rate of feed is gradually decreased, so that valve 22 remains de-activated during this period of gradual error signal reduction.

Over certain portions of the feed correction, it may occur that the rate of decrease in error signal does not completely correlate with the discharge rate of capacitor 50. In this case, valve 22 will be reactivated whenever a discrepancy between the two rates appears as an unbalance between the voltages developed across cathode resistors 34 and 36 occurs at these instances. Feed regulator motor 9 will thus be re-energized for all such periods in which the difference exists. The end result is that the regulator motor is intermittently energized for short time increments during the error reduction period to provide a reset function for the system and a fine adjustment in feed correction in addition to the large adjustment made initially. When detector 14 finally reaches the point of minimum or zero error, the cathode voltages of valves 20 and 22 substantially balance and the regulator motor 9 de-energizes until another error in quantity of feed appears.

Cathode resistor 36 is preferably an adjustable type, so that the quiescent plate currents of valves 20, 22 may be balanced in order to develop equal voltages across resistors 34, 36, when there is no error signal present.

By operating in this manner, the system has indirectly taken into account its own inherent delays in actuating the regulating motor due to relay inertia and lack of immediate response and overshoot in the regulating motor 9, itself, without the troublesome effects of hunting.

In a like manner, generation of a negative or decreased error signal by detector 14 causes a drop in the voltage developed across cathode resistor 34, which, in turn, actuates the magnetic coil of relay 24 in a direction such as to cause armature 38 to engage contact 38b and apply line voltage to motor 9 through line 42. Motor 9 then rotates in a direction opposite to that resulting from energization of line 40. Similarly when contact 38b is connected to armature 38, line voltage is applied to relay 28, causing armature 46 to move from its normally open position into engagement with contact 46b, and resistor 56 is then connected in series with resistor 48 and a resulting negative voltage is applied to the grid of valve 22. This negative voltage may be adjusted in a like manner to the positive voltage furnished by resistor 52 and potentiometer 54, by means of potentiometer 58. Capacitor 50 is thus charged in a direction opposite to that heretofore, and as this negative voltage increases, the plate current through valve 22 decreases until the voltage across resistor 36 decreases to a point where it is equal to the new, reduced voltage developed across resistor 34. Relay armature 38 then again returns to its central or deactivated position, and capacitor 50 discharges to ground through resistor 48 to perform the reset function described above. By means of potentiometer 58 and resistor 56, the time constant of the R-C circuit may likewise be proportioned as mentioned above to correlate with the rate of change of feed material 10.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

I claim:

1. A feed regulating system comprising a material feeder, a detector for detecting variations from a predetermined norm in selected characteristics of material being manufactured, said detector having an electrical output signal representative of said variations, a regulator for adjusting the amount of material being fed by said feeder to compensate for said variations, an amplifier for amplifying said output signal including an electronic valve having at least a grid circuit and a cathode circuit, a second electronic valve having at least a grid circuit and a cathode circuit, the cathode circuits of each of said valves including a source of voltage for selectively biasing said cathodes, a polar relay connected to said regulator and reversibly operative to apply an actuating voltage of selected polarity thereto, said relay having input terminals connected to each cathode circuit, means for adjusting said bias voltage applied to at least one of said cathode circuits to balance in polarity and magnitude the voltage applied in opposition across said relay terminals when said valves are in a quiescent condition, a resistance-capacitance charging circuit connected to said grid circuit of said second electronic valve, said polar relay having switch means connected serially between said grid circuit of said second valve and at least one source of selectable voltage, a source of grid voltage of selectable polarity for said second valve, said switch means being operative in response to actuation of said polar relay, when said output signal from said detector unbalances said voltage applied across said relay terminals, to apply said grid voltage in selected polarity to said charging circuit whereby said relay terminal voltage balance is gradually restored at a predetermined rate, the charging rate of said capacitance being substantially representative of the rate at which said regulator regulates the amount of material being fed by said feeder.

2. The feed regulating system defined in claim 1 wherein said system includes second switch means associated with said polar relay operative when said voltage across said relay terminals is balanced to discharge said capacitance at a rate representative of the rate of decrease in magnitude of said detector output signal.

References Cited in the file of this patent

UNITED STATES PATENTS

| | | |
|---|---|---|
| 1,777,670 | Hausman | Oct. 7, 1930 |
| 2,662,665 | Harper | Dec. 15, 1953 |
| 2,699,524 | Jackson et al. | Jan. 11, 1955 |